March 26, 1929.　　A. H. HANNON　　1,706,526
TRANSFER DEVICE
Filed Nov. 15, 1926　　2 Sheets-Sheet 1
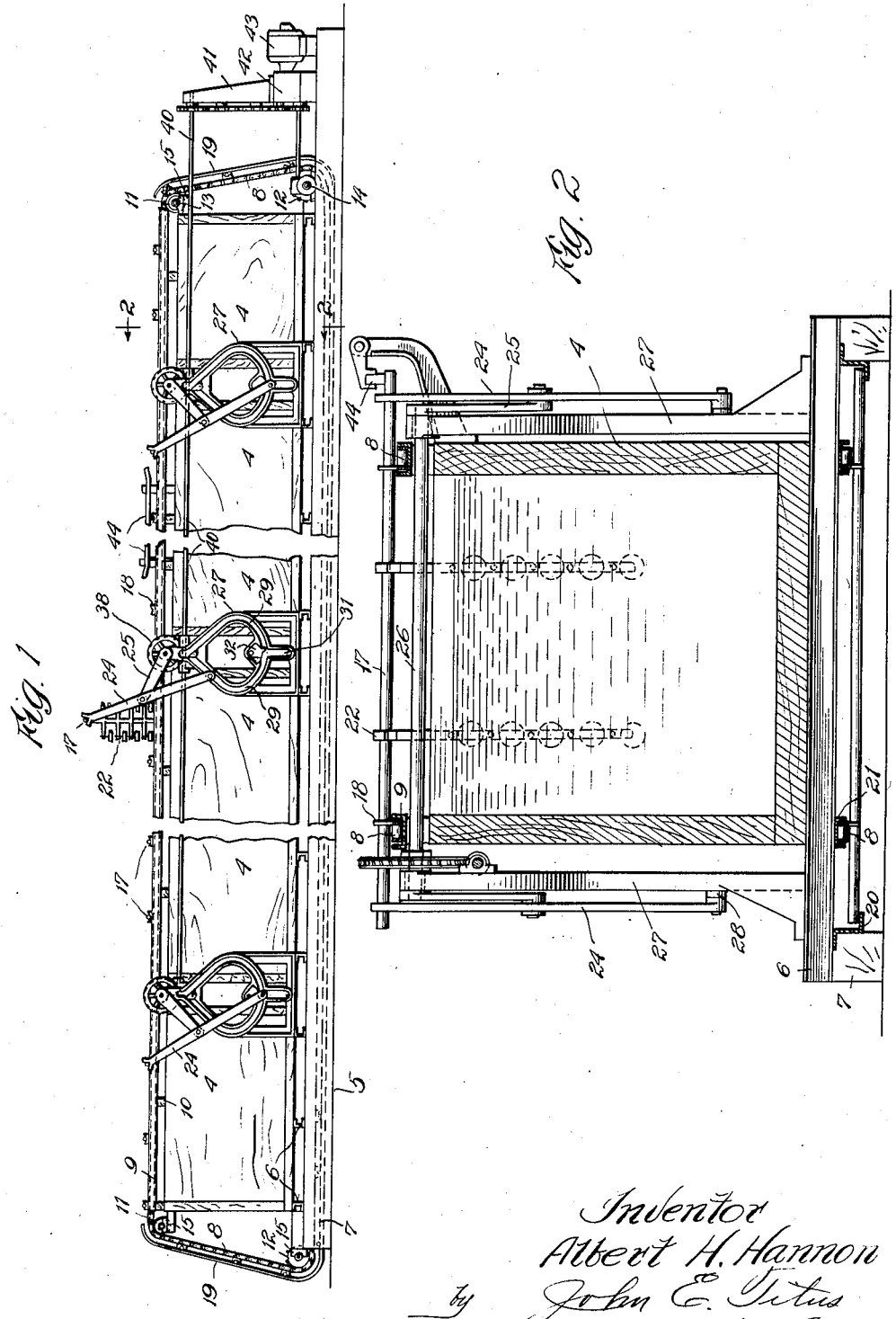
Inventor
Albert H. Hannon
by John E. Titus
his Atty

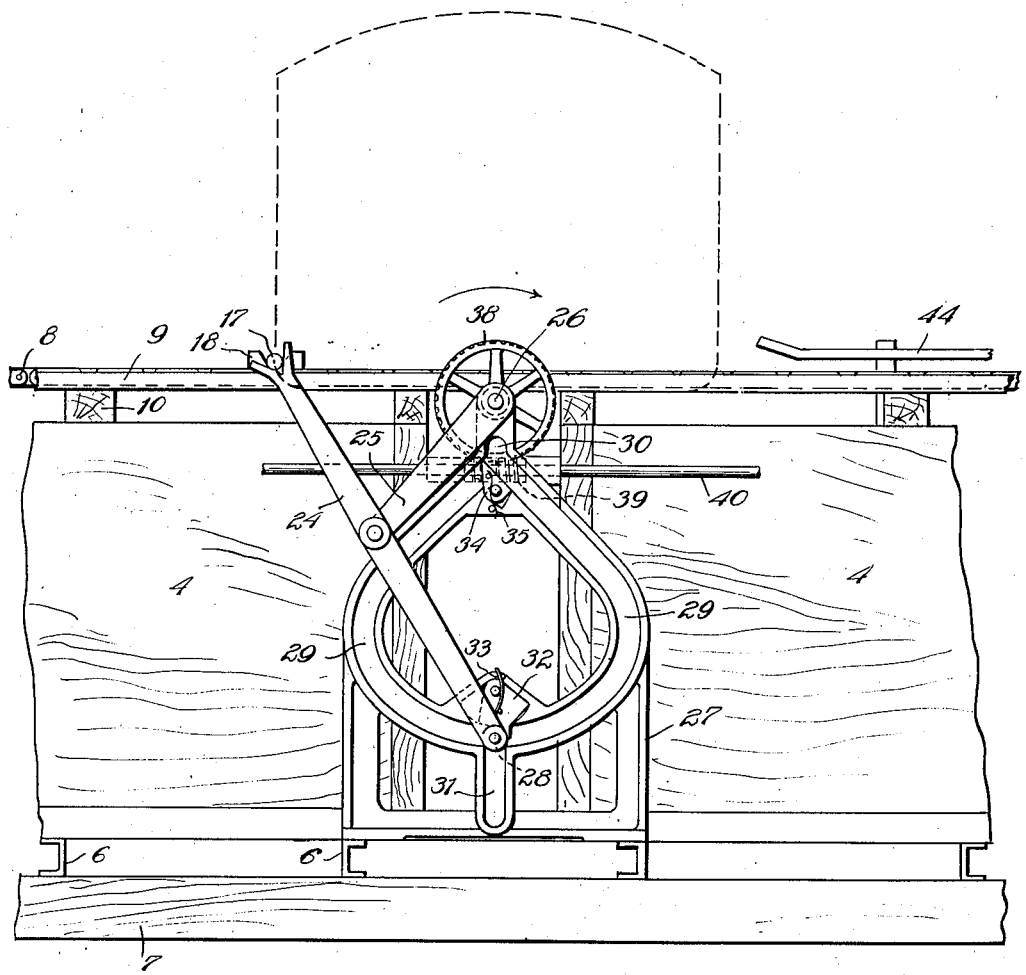

Patented Mar. 26, 1929.

1,706,526

UNITED STATES PATENT OFFICE.

ALBERT H. HANNON, OF CHICAGO, ILLINOIS.

TRANSFER DEVICE.

Application filed November 15, 1926. Serial No. 148,578.

This invention relates to improvements in transfer devices, more especially for electroplating apparatus wherein the work to be plated is hung on racks which are suspended from bars resting on moving conveyor belts to carry the work along through a series of tanks containing the different baths.

Heretofore, in electro-plating apparatus, considerable overhead structure was required to support the conveyor mechanism and transfer devices and the belt was entirely above the tops of the tanks. Two parallel chains were used with transversely extending rods carried by the chain, on which were hooked the racks on which the work was suspended. Considerable height was required between the two flights because the work must be lifted out of each tank and deposited in the succeeding tank.

In this invention the belt may be returned under the tanks and suitable sliding supports are provided to hold the cross rods in relation with the chain so that the rods are returned to the starting point. This eliminates the over head structure and obstructions over the surface of the tanks. The tank supports, which would be required in any case, are utilized for supporting the conveyor with the obvious result that the weight of the structure is reduced throughout.

Also very complicated mechanism was used for transferring the work from one tank to the next, the operation of which was generally unsatisfactory because it was difficult to time with the travel of the rods on the belt; and also was somewhat unsteady in its movement and was liable to shake the work of the rack since, ordinarily, a wire is attached to the work which is merely hooked over horizontal branches on the racks. In this invention a transfer mechanism is provided which is supported entirely below the tops of the tanks. The carrier members rise from below and engage the rods at the ends and lift the rods, with the racks of work suspended therefrom, vertically until the work is clear. Then the work is swung over horizontally with a steady and positively controlled movement and lowered vertically into the next tank and back onto the conveyor. Particular advantages of this transfer device are that extremely accurate timing with the conveyor is not required, the timing is easily adjusted, all of the transfer devices are easily driven from the same place at which the belt is driven, the frame work is below the tank tops, high lifts are easily attained, greater speeds may be employed, and the work transferred more rapidly. Also the mechanism is extremely simple and not likely to get out of order. Other objects and advantages will appear in the following description, with reference to the accompanying drawings, in which:

Fig. 1 is a side elevation of an electroplating apparatus embodying my invention.

Fig. 2 is a cross section taken on line 2—2 of Fig. 1.

Fig. 3 is an enlarged side elevation of the transfer device.

In the drawings a plurality of wooden tanks 4 are placed end to end in a line, supported on a suitable frame work above the floor line 5. Some of the tanks are short where only a dipping is required and others are quite long, where the plating operations are performed. The tanks are supported on channel iron cross members 6 which rest on wooden stringers 7, and insulated from the floor.

The conveyor belt comprises two endless chains 8 which travel across the tops of the tank along the opposite edges. The chains 8 slide in channel members 9 which are supported by blocks 10 on the upper edges of the tanks. At the ends of the line of tanks the chains pass over sprocket wheels 11 and 12 carried on shafts 13 and 14, which are rotatably mounted in bearings 15 supported from the upper and lower edges respectively of the end tanks; and the chains return in the space between the cross members 7 and the floor.

For supporting the conveyor rods 17, notched plates 18 are provided, suitably spaced along the length of the chains. The rods or cross bars 17 rest in the notched plates 18 in the upper portion of the belt and are held from disengaging from the notches at the ends by guide bars 19.

Along the under side of the tanks the rods slide at the ends in Z bars 20, which are secured to the cross ties 6, and support the chains which are guided from lateral shifting by the inverted channel bars 21, also attached to the cross ties 6.

The work is hung on the branches of the tree racks 22 which are hooked on to the rods 17 at the loading end at the left of Fig. 1, and removed at the unloading end, so that the work is suspended in the tanks as the rods 17 move along on the conveyor.

When a rod 17 approaches the end of a tank, it is engaged by the forked ends of the transfer carrier bars 24, which lift the rod vertically upward off the chains to lift the work out of the tank, and then swing the rod horizontally and lower the work into the next tank and return the rod into place in another pair of notched plates 18 on the chain. This operation is of course repeated at the end of each tank until the last tank is reached.

The carrier bars 24 are pivotally connected, near the middle, to the crank arms 25, which are keyed to the transverse shaft 26. The shaft 26 is located near the plane of the tops of the tanks and is supported in suitable bearings in the upper ends of the frames 27 which are located on either side of the line of tanks. At the lower ends each of the bars 24 are guided to oscillate on the crank by means of a roller 28, rotatably mounted on the bar, which rides in a cam groove formed in the frame. The cam groove is divided into two paths 29 which are symmetrically disposed on either side of a vertical plane through the axis of the shaft 26. At the upper and lower ends the paths 29 join into straight portions 30 and 31 respectively, and is so shaped that the bar 24 is guided, while carried around on the crank 25, to cause the upper or engaging end of the bar to move in a substantially rectangular path, as indicated in broken lines in Fig. 3.

The roller 28 is guided into the path 29, at the left, as the bar is raised, by means of the latch member 32, which is pivotally mounted in the frame and pressed for counter rotation by means of the spring 33. At the upper end, the roller moves the upper end of the latch 34 to the right and is guided thereby into the straight cam portion 30. At this position the vertical movement is completed and the roller is guided to move only vertically while the crank is turning through the upper arc of its rotation, with the result that the bar is positively swung to the right without any slack motion or jarring.

At the end of the horizontal movement, which places the work over the succeeding tank, the roller begins to move downwardly, and is directed into the right hand path 29 by the latch 34, which has snapped back into the position shown in Fig. 3, under the pressure of the spring 35.

The bar 24 is then guided so that the upper end moves vertically downward. At the lower portion, the roller pushes the latch 32 aside, and is thereby guided into the vertical path 31, which causes the upper end to swing back to the starting position at the left, ready to lift and transfer the next rod.

A worm gear 38 is keyed on each of the transfer shafts 26, and the worm gears each mesh with corresponding worms 39 which are all keyed to the line shaft 40 which is rotatably mounted in suitable bearings in the frames 27, at one side of the tanks.

At the right end in Fig. 1, the line shaft 40 extends into the transmission stand 41, and is geared through as suitable speed reduction transmission 42 to the motor 43. The conveyor belt is also driven from the transmission 42, through a worm and gear, not shown, which is keyed on the lower sprocket shaft 14.

By this arrangement, timing between the chains and the transfer devices, is easily accomplished. Also the individual transfers are easily adjusted by shifting the worms axially on the shaft by methods which are well known in the mechanical arts.

In the plating tanks the anodes may be arranged in the usual well known manner, such as suspended from the sides of the tank, and the cathode connection made through bus bars 44, which rest on the tops of the rods 17. The bars are pivotally mounted in arms attached to the sides of the tanks, with a limited downward movement; and the ends of the bars 44 are bent upwardly, as indicated in Fig. 3 to allow the rods 17 to move under and lift the bus bars.

I claim:

1. A transfer device comprising a frame, a shaft rotatably mounted in the frame, a crank keyed to the shaft, a carrier bar centrally pivoted to the crank, and a guide cooperating with the lower end of the bar, said guide adapted to oscillate the bar while the shaft and crank are rotated so as to cause the upper engaging end of the bar to move vertically upward from a starting position, then horizontally, then vertically downward, and then horizontally back to the starting position.

2. In a transfer device, a pedestal frame, a shaft rotatably mounted in said frame, a crank keyed on the shaft, a carrier bar pinned to the crank between the ends, said bar having a cam roller on the lower end, and said frame having a cam groove receiving said roller whereby the bar is oscillated on the crank to cause the upper engaging end of the bar to move in a quadrilateral path.

3. In a transfer device, a rotatably mounted crank, a carrier bar medially pivoted to the crank, a two way guide member cooperating with the lower end of said bar, and latches for directing the lower end of the bar from a one way relation with said guide into the other way relation at each half rotation of the crank.

4. A transfer device comprising a frame, a crank shaft rotatably mounted in the frame, a carrier bar medially pivoted to the crank of said shaft, a roller rotatably mounted in the lower end of said bar, said frame having two cam grooves for the roller, said grooves joined at the ends and arranged symmetrically with respect to a line through the axis of the shaft, and latches at the junctions of the grooves adapted to direct the roller from one groove into the other.

In testimony whereof, I affix my signature.

ALBERT H. HANNON.